United States Patent [19]

West

[11] Patent Number: 4,488,634
[45] Date of Patent: Dec. 18, 1984

[54] METHOD OF REDUCING DAMAGE TO FOODSTUFFS USING CUSHIONING AQUEOUS FOAMS

[75] Inventor: William T. West, Wayne, Pa.

[73] Assignee: Pennwalt Corporation, Philadelphia, Pa.

[21] Appl. No.: 371,866

[22] Filed: Apr. 26, 1982

[51] Int. Cl.³ ............................................. B65G 45/00
[52] U.S. Cl. .................................. 198/493; 198/500; 198/688
[58] Field of Search ............. 198/500, 688, 493, 495, 198/836; 427/154, 155, 156; 206/205; 15/3.13, 3.14, 3.15, 3.16; 184/15.1; 134/48

[56] References Cited

U.S. PATENT DOCUMENTS

| | | | |
|---|---|---|---|
| 1,475,804 | 11/1923 | Du Bois et al. | 426/273 |
| 2,222,000 | 11/1940 | Schmidt | 426/293 |
| 2,367,354 | 1/1945 | Kanter | 198/500 |
| 2,750,293 | 6/1956 | Burmeister | 99/113 |
| 3,053,371 | 9/1962 | Fischer | 198/500 |
| 3,120,669 | 2/1964 | Montuori | 15/3.13 |
| 3,155,102 | 11/1964 | Niederer, Jr. et al. | 198/495 |
| 3,529,868 | 9/1970 | Hogg | 198/500 |
| 3,783,990 | 1/1974 | Siciliano | 198/688 |
| 4,262,776 | 4/1981 | Wilson et al. | 198/500 |
| 4,375,374 | 3/1983 | Kronseder et al. | 198/493 |

Primary Examiner—Leslie J. Paperner
Assistant Examiner—Daniel R. Alexander

[57] ABSTRACT

Damage to foodstuffs, such as eggs, during handling operations is reduced by providing the handling apparatus, such as a conveyor, with a layer of an aqueous foam to cushion the foodstuffs from hard contact with each other.

11 Claims, 1 Drawing Figure

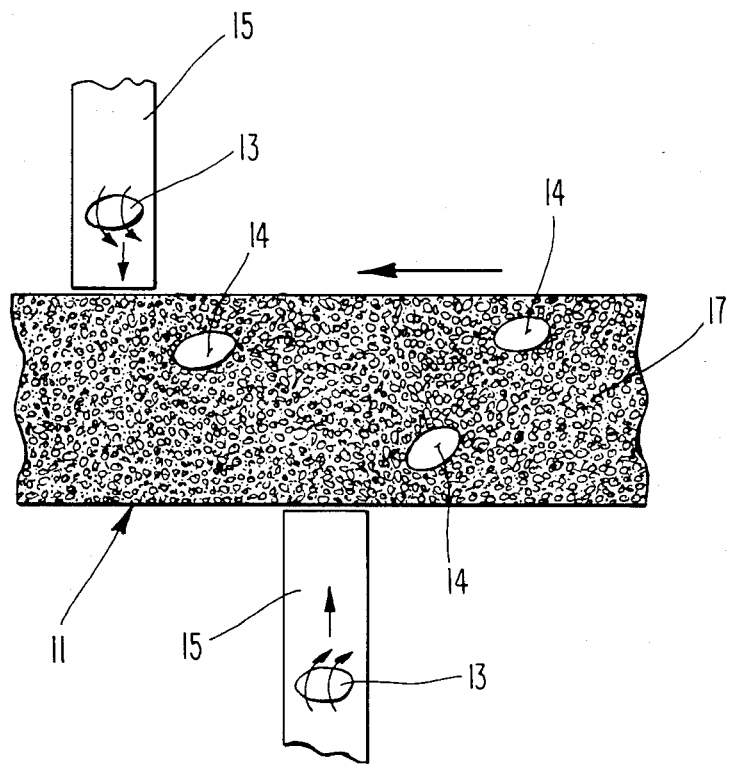

4,488,634

METHOD OF REDUCING DAMAGE TO FOODSTUFFS USING CUSHIONING AQUEOUS FOAMS

BACKGROUND OF THE INVENTION

This invention relates generally to article handling and more specifically to a process for reducing breakage or damage to foodstuffs such as eggs during transport in automated facilities.

In the sorting, transporting, cleaning, treating and/or packaging operations of perishable or fragile articles, damage or breakage can occur due to hard contacts between the articles or between the articles and the handling equipment, particularly during conveyor transport. For example, fresh fruits are bruised which leads to spoilage or reduced market value, or in the case of eggs, cracking and breakage. In commercial egg production, freshly laid eggs roll down inclines onto a central conveyor which transport them to a washer. Some eggs contact the conveyor or each other with sufficient force to crack their shells making them unmarketable as whole eggs.

BRIEF SUMMARY OF THE INVENTION

In accordance with this invention there is provided a process for reducing damage to articles during handling comprising providing the article contacting surfaces of article handling apparatus with a cushioning layer of aqueous foam.

DESCRIPTION OF THE DRAWING

The FIGURE is a schematic plan view with parts broken away of an apparatus for collecting and conveying eggs, such as in an automated egg producing operation, which illustrates the cushioning foam process of the invention.

DETAILED DESCRIPTION

The aqueous foams useful in the process of the invention are formed either chemically (carbonate+acid to form $CO_2$) or physically by mixing foam forming materials and water using mechanical agitation or a source of gas under pressure such as compressed air. Surfactants which have high foaming properties are preferred, but other materials such as soaps, oils and proteins, for example, alginates, gums and licorice etc. can be used. Mixtures of foam forming materials can be used. The foams can include materials which are foam boosters and/or stabilizers, chelating agents, corrosion inhibitors, detergents, bacteriostats, and pH controllers.

Examples of surfactants which have good foam forming properties include; alkyl sulfates (sulfated alcohols), ethoxylated and sulfated alkyl phenols, ethoxylated and sulfated alcohols, and sulfated alkanolamides. Examples of foam boosters and/or stabilizers include; fatty dialkanolamides and amine oxides. Such surfactant materials are readily available and their properties and specific examples are described in Kirk Othmer, *Encyclopedia of Chemical Technology*, "Surfactants", Second Edition, Vol. 19 pages 507–566 and lists available from McCutcheon Division, MC Publishing Co., Glen Rock, N.J. which are incorporated herein by reference.

Examples of materials which provide detergency, corrosion and pH control are alkali metal phosphates such as monosodium phosphate, disodium phosphate, trisodium phosphate, sodium hexamethaphosphate, sodium tripolyphosphate, tetrapotassium pyrophosphate, tetrasodium pyrophosphate, monopotassium phosphate, dipotassium phosphate and tripotassium phosphate and alkali metal silicates such as sodium silicate, sodium disilicate, sodium metasilicate, sodium orthosilicate, potassium metasilicate and potassium tetrasilicate. The foams should be neutral or slightly alkaline to reduce corrosion and, in the case of eggs to avoid acid attack on the shells.

Examples of chelating agents are gluconates, such as sodium and potassium gluconate, the tetrasodium salt of ethylenediamine tetraacetic acid, sorbitol, mannitol, sorbose, d-gluconolactone and l-rhannose. Examples of bacteriostats are a product marketed by Dow Chemical under the trademark Dowicil 75 (a mixture of 1-(3-chloroalkyl)-3,5,7-triaza-1-azoniaadamantane and sodium bicarbonate) and sodium omadine.

Stiff, cushioning foams are formed by mixing the materials with water in high speed blenders or mixers. Suitable machines are commercially available. For example, FOAMALL applicators of Dubois Chemicals; Graco ® Foamer, Graco, Inc.; and Dema Engineering Co. foamers which are used to form aqueous foams for industrial and vehicle cleaning operations. The concentrations of materials used to form a cushioning foam will depend upon the particular foam materials employed and can be readily determined. Generally from about 1 to 30 fluid ounces of foam forming materials per gallon of water are used. Excess material is to be avoided from an economic standpoint. However, sufficient material must be used to provide a foam of stiffness and elasticity to provide the needed cushioning effect for any given application.

The foam can be applied to the processing equipment, such as a conveyor, by any convenient means to provide for the application and maintenance of a cushioning layer of aqueous foam. For example, a conduit leading to the conveyor from the foam forming equipment or by using spray nozzles.

EXAMPLE

An aqueous foam was prepared in a blender using a commercial dishwashing liquid and water. A stationary egg on a flat surface was surrounded with the foam and eggs were rolled down an incline under conditions which caused at least one of the eggs to crack on contact when no foam was present. In no case was cracking observed when using the foam.

In an automated egg producing operation, eggs would be moving on a conveyor running the length of the building housing the hens past a plurality of inclines. Collisions randomly occur between eggs already on the conveyor and those rolling down the inclines. The foam, which would also aid in softening any soil on the eggs, is removed during the normal egg washing process.

As illustrated in the FIGURE, a conveyor 11 moves in the direction of the arrow to receive eggs 13 from inclines 15 which are located on each side of conveyor 11. The surface of conveyor 11 is covered with a layer 17 of aqueous foam which surrounds and cushions eggs 14 which are already on the conveyor so that should contact occur between eggs 13 and 14 as eggs 13 roll by gravity down incline 15 onto conveyor 11, cracking of the egg shells is avoided.

I claim:

1. A method of reducing damage to fragile foodstuff during handling comprising protecting said foodstuffs by substantially surrounding the surface area of said foodstuffs with a stiff cushioning layer of aqueous foam formed by mixing a foam forming material with water.

2. The method of claim 1 whereby said cushioning layer is applied to the foodstuff contacting surfaces of foodstuff transporting apparatus.

3. The method of claim 2 wherein said foodstuffs are eggs and whereby said foam is applied to a conveyor belt.

4. The method of claim 1 wherein said foam forming material is present in an amount of from about 1 to about 30 fluid ounces of material per gallon of water.

5. The method of claim 1 wherein said foam forming material is selected from the group consisting of surfactants, soaps, oils, proteins and mixtures thereof.

6. The method of claim 1 wherein said foam includes an alkali metal phosphate.

7. The method of claim 1 wherein said foam includes a foam booster.

8. The method of claim 7 wherein said foam booster is selected from the group consisting of fatty dialkanolamides and amine oxides.

9. The method of claim 1 wherein said foam includes an alkali metal silicate.

10. The method of claim 1 wherein said foam includes a chelating agent.

11. The method of claim 1 wherein said foam includes a bacteriostat.

* * * * *